United States Patent [19]

Peacock

[11] Patent Number: 4,822,133
[45] Date of Patent: Apr. 18, 1989

[54] OPTICAL CABLES
[75] Inventor: Alan J. Peacock, Essex, England
[73] Assignee: Telephone Cables Limited, England
[21] Appl. No.: 80,439
[22] Filed: Jul. 30, 1987
[30] Foreign Application Priority Data Aug. 7, 1986 [GB] United Kingdom ............... 8619308

[51] Int. Cl.⁴ .............................................. G02B 6/44
[52] U.S. Cl. .............................................. 350/96.23
[58] Field of Search .................................... 350/96.23

[56] References Cited

U.S. PATENT DOCUMENTS

| | | | |
|---|---|---|---|
| 4,166,670 | 9/1979 | Ramsay | 350/96.23 |
| 4,199,224 | 4/1980 | Oestreich | 350/96.23 |
| 4,685,765 | 8/1987 | Daly et al. | 350/96.23 X |
| 4,701,016 | 10/1987 | Gartside, III et al. | 350/96.23 |
| 4,703,997 | 11/1987 | Ijiri et al. | 350/96.23 |

FOREIGN PATENT DOCUMENTS

| | | |
|---|---|---|
| 0060180 | 9/1982 | European Pat. Off. . |
| 0135132 | 3/1985 | European Pat. Off. . |
| 0158855 | 10/1985 | European Pat. Off. . |
| 1481582 | 8/1977 | United Kingdom . |
| 1577323 | 10/1980 | United Kingdom . |
| 2051398 | 1/1981 | United Kingdom . |
| 2064163 | 6/1981 | United Kingdom . |
| 2073440 | 10/1981 | United Kingdom . |
| 2105486 | 3/1983 | United Kingdom . |
| 2110415 | 6/1983 | United Kingdom . |

Primary Examiner—John D. Lee
Assistant Examiner—Phan T. Heartney
Attorney, Agent, or Firm—Kirschstein, Kirshstein, Ottinger & Israel

[57] ABSTRACT

An optical fibre cable, especially an aerial cable, has, within an outer sheath four or five strength members with at least one optical fibre package accommodated in an interstitial space formed by the strength members. Such a cable can be constructed to have sufficient tensile strength for installation between towers up to 1000 meters apart.

14 Claims, 1 Drawing Sheet

OPTICAL CABLES

FIELD OF THE INVENTION

This invention relates to optical cables, and especially to such cables of the kind known as aerial cables which are designed to be freely suspended from spaced supports which may be up to 1000 meters apart.

SUMMARY OF THE INVENTION

In its broadest aspect the invention comprises an optical cable having, within an outer sheath, at least three longitudinally extending strength members with at least one interstitial space between them in which there is loosely accommodated a package comprising a plurality of optical fibres.

The optical fibres may be in the form of a stranded bundle, a ribbon, a plurality of ribbons stacked one upon the other, or other convenient configuration.

Preferably the fibre package is contained within a tube dimensioned to allow a degree of transverse movement of the fibres within it, the tube being preferably filled with a water blocking substance such as grease. A water blocking substance may also be incorporated in the interstices between adjacent strength members, and between the strength members and the outer sheath.

For use as an aerial cable the strength members must, of course, provide an adequate resistance to stretching of the cable to prevent an undue stress being applied to the fibres when the cable is suspended between two supports spaced apart the maximum distance for which the cable is designed to be used.

Moreover it is particularly desirable for aerial cables to have the minimum overall diameter for a given total cross-sectional area of the strength members, but at the same time there should be adequate interstitial space for the optical fibre package or packages.

We have found that with strength members of circular cross-section this is conveniently achieved with four or five strength members, these preferably being formed of glass reinforced plastic or other suitable high modulus material stranded together in a helical configuration.

In the case of an aerial cable incorporating four circular-sectioned strength members, optical fibre packages are conveniently stranded around the strength members in the interstitial channels formed between adjacent members and the inner surface of the surrounding sheath, the depth of the channels being such that the optical fibre packages are spaced from the inner surface of the sheath. This protects the fibres against external pressure during installation and use of the cable.

The strength members may, for example have a diameter of about 5 millimeters, this permitting a tube of approximately 2 millimeters external diameter, and containing, say, four optical fibres, to be accommodated in the said interstitial channels without contacting the inner surface of the sheath. A cushioning member may be provided in the central channel between the four stranded strength members in such a case.

Where five strength members are employed the optical fibres are conveniently accommodated in a central channel surrounded by the strength members.

BRIEF DESCRIPTION OF THE DRAWINGS

Two alternative forms of aerial cables in accordance with the invention will now be described by way of example with reference to FIGS. 1 and 2 of the accompanying drawing, which represent transverse sections through the two forms of cable.

DETAILED DESCRIPTION OF THE PREFERRED EMBODIMENTS

Figure 1:
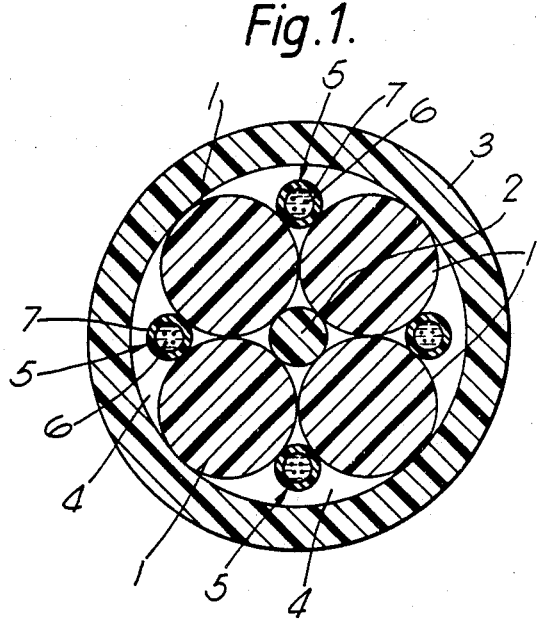

Referring first to FIG. 1, this illustrates a cable comprising four circular sectioned strength members 1 of glass-reinforced plastics material, each having a diameter of approximately 5 mm stranded together around a central filler 2 of polyethylene having a diameter of approximately 2 mm, and surrounded by a close fitting polyethylene or other polymer sheath 3 having a wall thickness of approximately 1.5 mm.

Within the four channels 4 formed between adjacent pairs of strength members 1 there are located four optical fibre elements 5, each of which comprises a bundle of four single mode optical fibres 6 within a 2 mm diameter tube 7 of a suitable polymer having a filling of grease or other water blocking compound which allows a degree of transverse movement of the fibres within the tube. The depth of the channel 4 is such that the optical fibre elements 5 are spaced from the inner surface of the surrounding sheath 3, and thereby protected against external pressure.

The interstitial spaces between the strength members 1, optical fibre elements 5 and the sheath 3 may also be filled with a suitable water-blocking compound to prevent water penetration along the cable.

The sheath may contain a suitable filler to provide an adequate level of resistivity.

Figure 2:
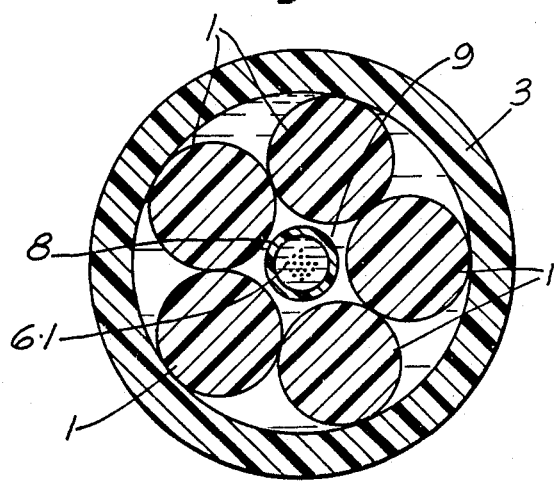

The second cable, illustrated in FIG. 2 comprises five stranded-together strength members 1, similar to those of the cable shown in FIG. 1, and similarly surrounded by a polyethylene outer sheath 3.

In this case the dimensions of the channels formed by the interstices between adjacent strength members 1 and the inner surface of the sheath 3 are inadequate to accommodate optical fibre elements of the diameter of those of the previous embodiment without being contacted by the sheath, and in this case sixteen optical fibres 6.1 are accommodated in a single polymer tube 8, having a diameter of approximately 3.25 mm, located in the central channel 9 bounded by the stranded strength members 1. The tube 8 is filled with grease or other suitable water blocking compound which permits movement of the fibres within the tube, as in the previous embodiment, and the interstices between strength members 1, the tube 8 and the sheath 3 may also be filled with a water blocking compound. The fibres 6.1 may be stranded together or disposed in a stacked 4×4 array, or arranged in any other convenient manner.

As with the previous embodiment the fibres are protected against external pressure.

The strength members may, in some cases, be coated with a plastics material to give added mechanical and-/or environmental protection.

I claim:
1. An optical cable, comprising:
   a cylindrical outer sheath having an inner and an outer surface;
   at least three longitudinally extending cylindrical strength members accommodated within and form- ing interstitial spaces with said outer sheath, each strength member having a radius and bearing against only two other strength members and against said inner surface of said outer sheath; and at least one package having a radius and including a plurality of optical fibres accommodated in at least one interstitial space between said strength members, the radius of said package being substantially smaller than the radius of a respective one of said strength members, and said package being spaced from the inner surface of said outer sheath.

2. An optical cable according to claim 1 wherein each fibre package is contained within a tube dimensioned to allow a degree of transverse movement of the fibres within it.

3. An optical cable according to claim 2 wherein each tube contains a water blocking substance.

4. An optical cable according to claim 3 wherein the water blocking substance is incorporated in the interstitial spaces between adjacent strength members and between the strength members and the outer sheath.

5. An optical cable according to claim 3 wherein the water blocking substance is in the form of grease substantially filling the tube.

6. An optical cable according to claim 1 in which the strength members are formed of a glass reinforced plastics material stranded together in a helical configuration.

7. An optical cable according to claim 1 having four strength members of circular cross-section.

8. An optical cable according to claim 7 incorporating a plurality of optical fibre packages stranded around the strength members in the interstitial channels formed between adjacent members and the inner surface of the surrounding sheath, the depth of the channels being such that the optical fibre packages are spaced from the inner surface of the sheath.

9. An optical cable according to claim 8 wherein the strength members are stranded around a cushioning member.

10. An optical cable according to claim 1 having five strength members of circular cross-section.

11. An optical cable according to claim 10 in which the optical fibre package is disposed in a central channel surrounded by the strength members.

12. An optical cable according to claim 1 wherein the optical fibres of the package are in the form of a stranded bundle.

13. An optical cable according to claim 1 wherein the strength members have a continuous coating of plastics material.

14. An aerial cable which is an optical cable according to claim 1.

* * * * *